Oct. 21, 1952  F. C. I. MARCHANT ET AL  2,614,815
AIRCRAFT CABIN PRESSURIZING AND AIR CONDITIONING APPARATUS
Filed Jan. 19, 1948
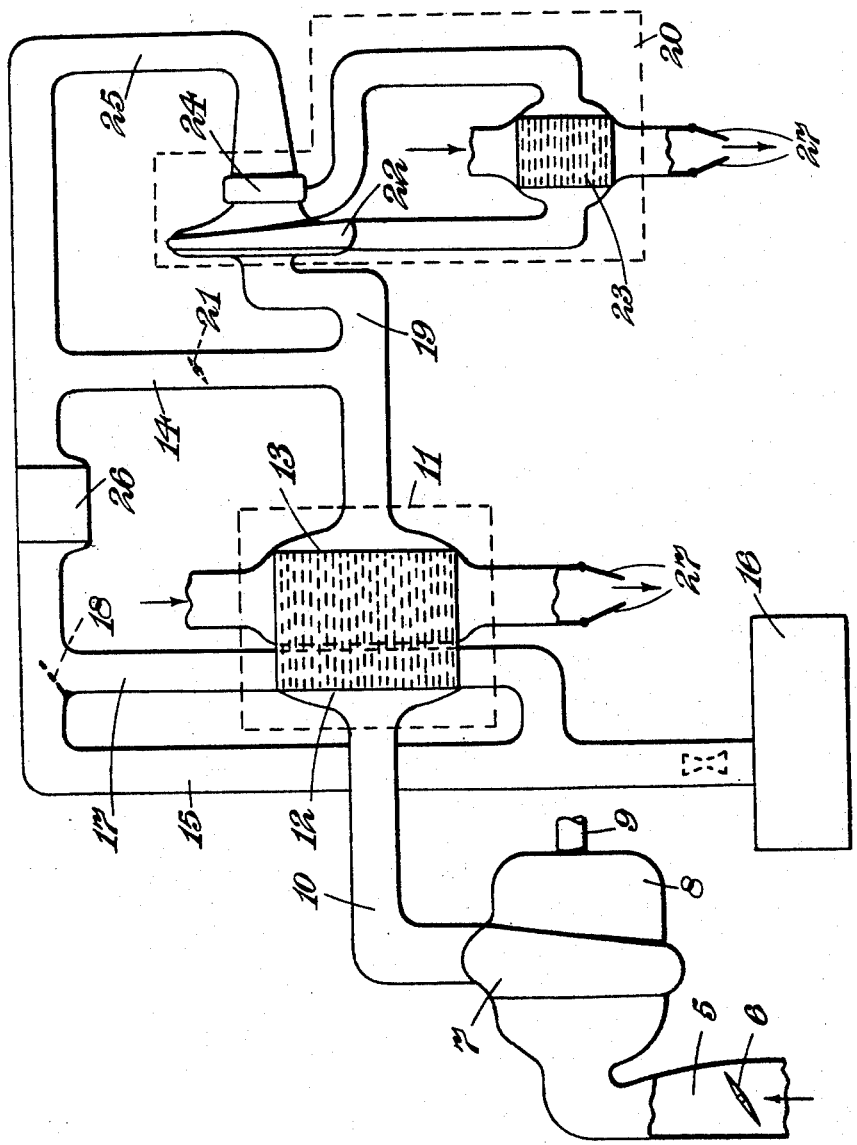
INVENTORS
FRANCIS C. I. MARCHANT &
GORDON M. LEWIS
by Wilkinson Mawhinney
ATTORNEYS Patented Oct. 21, 1952

2,614,815

UNITED STATES PATENT OFFICE 2,614,815

AIRCRAFT CABIN PRESSURIZING AND AIR CONDITIONING APPARATUS

Francis Charles Ivor Marchant and Gordon Manns Lewis, Bristol, England, assignors to The Bristol Aeroplane Company Limited, Bristol, England, a British company Application January 19, 1948, Serial No. 3,094
In Great Britain January 20, 1947

1 Claim. (Cl. 257—9)

This invention concerns apparatus for maintaining in an aircraft cabin a pressure which is greater than the atmospheric pressure when the aircraft is in flight above a selected altitude. This apparatus is commonly referred to as cabin-pressurizing apparatus and will be so called in this specification.

The object of the present invention is to provide an apparatus which affords a wide range of temperature of the pressurizing air without unduly increasing the number of parts (and hence the weight) of the apparatus and also means for adjusting the de-humidification of the air.

Hitherto, this range of temperature has been obtained by providing in the apparatus either a cooler or a combustion or exhaust-gas heater. The former heater incorporates a fuel burner and the latter heater has the exhaust-gases from an engine passed through it in heat-exchange relationship with the pressurized air.

More specifically this invention has for its object to eliminate such heaters whilst enabling the pressurized air to be heated.

The invention relates to cabin pressurizing apparatus of the type in which the air is compressed, passed through a cooler and delivered therefrom to the cabin.

According to the present invention cabin pressurizing apparatus of the type set forth is characterised in that the air delivered by the cooler is capable of being brought into heat-exchange relationship with the compression-heated air delivered from said compressor thereby to regulate the temperature of the air entering the cabin.

According to a feature of the present invention the cooler and the re-heater together constitute a unitary assembly through which the compressed air passes from the re-heater to the cooler.

There may be a valve to regulate the quantity of compressed air passing from the cooler respectively direct to the cabin and through the re-heater.

The delivery side of the cooler may optionally be connected to a second cooler whose delivery is adapted to be passed to the cabin either direct or through the re-heater.

A practical application of the invention will now be described, by way of example, with reference to the accompanying drawing which shows a schematic layout of a cabin pressure apparatus in accordance with the present invention.

Referring to the drawing: air enters the cabin pressurizing apparatus by an intake 5, the quantity of air being suitably controlled by means of a valve 6. The intake 5 leads to a two-stage primary compressor 7 which is driven through a multi-speed gear box 8 by a motor (not shown), the input shaft of the gear box being indicated at 9. Air from the compressor 7 is delivered to a duct 10 which leads to an assembly 11 comprising a re-heater 12 and a primary cooler 13. The air from the duct 10 passes in succession through the units 12 and 13, that is, through the re-heater and then the cooler.

The compressed air leaving the assembly 11 passes along main duct 14, 15 to the cabin 16. The duct 14 communicates with a by-pass conduit 17 leading to the re-heater 12. The passage of air from the duct 14 to the conduit 17 is controlled by a valve 18.

It will be clear from the above description that the air delivered by the compressor 7 passes through the assembly 11 and thence by duct 14 towards the cabin 16. By suitably adjusting the valve 18 the quantity of air flowing along the duct 15 and conduit 17 may be varied. Thus, the quantity of the total air delivered to the cabin 16 which passes through the re-heater 12 is variable.

The duct 14 also communicates with a further by-pass conduit 19 which leads to a secondary cooler generally indicated by the reference numeral 20. The quantity of air passing along the duct 14 and conduit 19 is regulated by the valve 21 the arrangement being that as this valve is closed a greater quantity of air enters the conduit 19 and passes through the cooler 20.

The secondary cooler 20 comprises a secondary compressor 22 to which the air from the conduit 19 is delivered, a heat exchanger 23 to which the compressor 22 delivers and a turbine 24 to which the heat exchanger 23 delivers. The discharge from the turbine 24 is led back by a duct 25 to the duct 14 at the downstream side of the valve 21. The turbine 24 drives the compressor 22 and as a consequence the air in passing through it does work at the expense of its heat content. The air is thus cooled to a temperature below the ambient air temperature and in so doing the temperature is lowered to below its dew point. The moisture in the air is therefore extracted on the delivery side of the secondary cooler 20. To this end a water separator 26 is provided between the ducts 14 and 15.

One or more of the valves 18, 21 may be adjusted by a temperature-sensitive device exposed to the air in the cabin 16.

The coolant for the coolers 13 and 23 is ambient air and the passage of the air through each cooler is preferably regulated by controllable gills 27. The gills may also be adjusted by the temperature sensitive device in the cabin 16.

In use the air leaving the primary compressor 7 becomes heated as a result of the compression to which it is subjected but in passing through the cooler 13 its temperature is lowered. All the air delivered by the compressor 7 passes through the cooler and under certain circumstances it may be necessary to have this air over-cooled so that its moisture content may be reduced to a predetermined amount. This over-cooling is performed by passing the air from the assembly 11 through the secondary cooler 20. As a consequence of the over-cooling the moisture may be effectively and readily extracted in the water separator 26. The over-cooled air is at too low a temperature for direct delivery to the cabin 16 and accordingly a part of the air, after water extraction, is passed through the re-heater 12 where it is heated by the compressed air from the compressor 7. By suitably adjusting the valve 18 the temperature of the air entering the cabin 16 may be varied to a suitable value.

We claim:

Apparatus for pressurizing and conditioning air to be delivered to the cabin 16 of an aeroplane comprising a primary compressor 7 to draw air from the ambient atmosphere and deliver it under pressure at a high temperature, a reheater 12, a duct 10 to convey air from said compressor to the reheater, a primary cooler 13 to receive the compressed air from the reheater, a duct to deliver ambient air to said primary cooler to pass in heat exchange relationship with compressed air from said reheater, valve means 27 to regulate the quantity of ambient air passing through the primary cooler, a main duct (14, 15) to convey compressed air from the primary cooler directly to the cabin, a conduit 17 to bypass said main duct and convey compressed air from the primary cooler indirectly to the cabin by way of the reheater said compressed air passing in heat exchange relationship with the heated compressed air passing from the primary compressor to the primary cooler, a valve means 18 to regulate the quantity of air going to the cabin directly and also indirectly through the reheater, a secondary cooler 20, a conduit (19, 25) to bypass said main duct and convey compressed air from the primary cooler to the secondary cooler and thence to said reheater, a secondary-cooler valve 21 to regulate the quantity of compressed air passing around the secondary-cooler bypass which air is over cooled in the secondary cooler to lower its temperature below ambient air temperature and its dew point, and a water separator 26 in the secondary-cooler bypass to remove moisture from the air delivered by the secondary cooler to the reheater, said reheater raising the temperature of the air delivered by the water separator prior to its introduction into the cabin.

FRANCIS CHARLES IVOR MARCHANT.
GORDON MANNS LEWIS.

REFERENCES CITED

The following references are of record in the file of this patent:

UNITED STATES PATENTS

| Number | Name | Date |
|---|---|---|
| 946,069 | Reynolds | Jan. 11, 1910 |
| 1,965,078 | Hewitt | July 3, 1934 |
| 1,986,529 | Ray | Jan. 1, 1935 |
| 2,063,477 | Young et al. | Dec. 8, 1936 |
| 2,077,315 | Ewing | Apr. 13, 1937 |
| 2,244,319 | Thatcher | June 3, 1941 |
| 2,293,557 | Newton | Aug. 18, 1942 |
| 2,304,151 | Crawford | Dec. 8, 1942 |
| 2,391,838 | Kleinhans et al. | Dec. 25, 1945 |
| 2,485,522 | Anderson | Oct. 18, 1949 |
| 2,485,590 | Green | Oct. 25, 1949 |
| 2,496,602 | Schlichtig | Feb. 7, 1950 |
| 2,509,899 | Wood | May 30, 1950 |